March 12, 1963 M. E. WOOD 3,080,696
DEVICE FOR ATTACHING IMPLEMENTS TO TRACTORS
Filed June 21, 1960 3 Sheets-Sheet 1
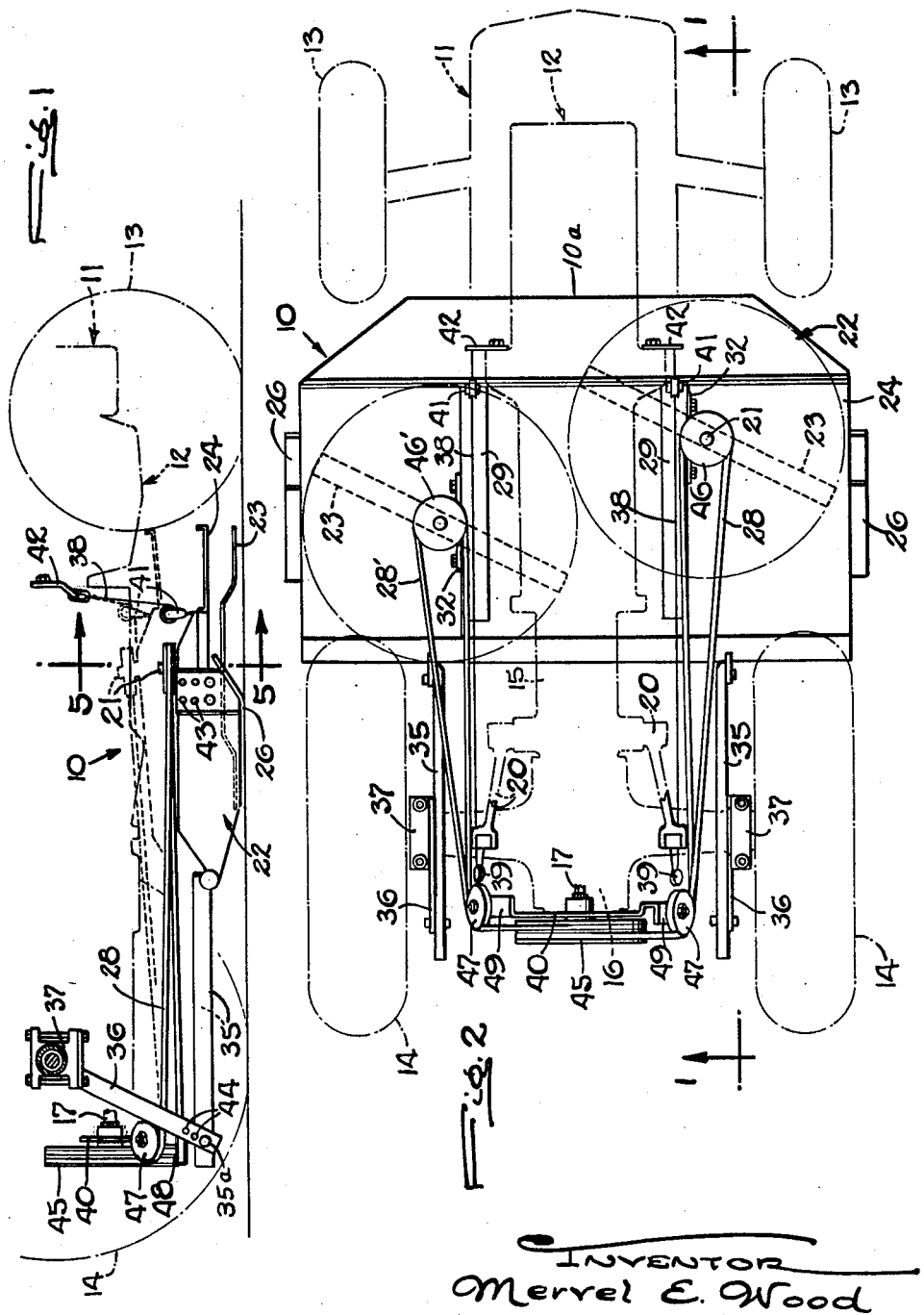
INVENTOR
Mervel E. Wood
by Wolfe, Hubbard, Voit & Osann
ATTORNEY March 12, 1963 M. E. WOOD 3,080,696
DEVICE FOR ATTACHING IMPLEMENTS TO TRACTORS
Filed June 21, 1960 3 Sheets-Sheet 2
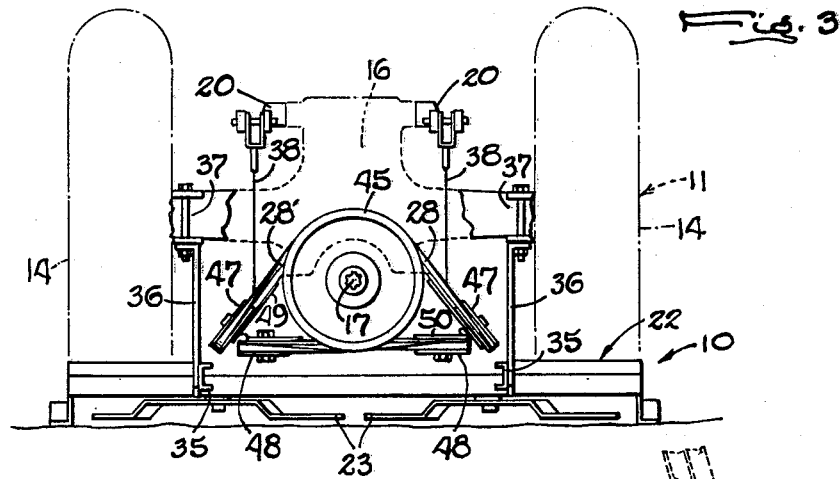
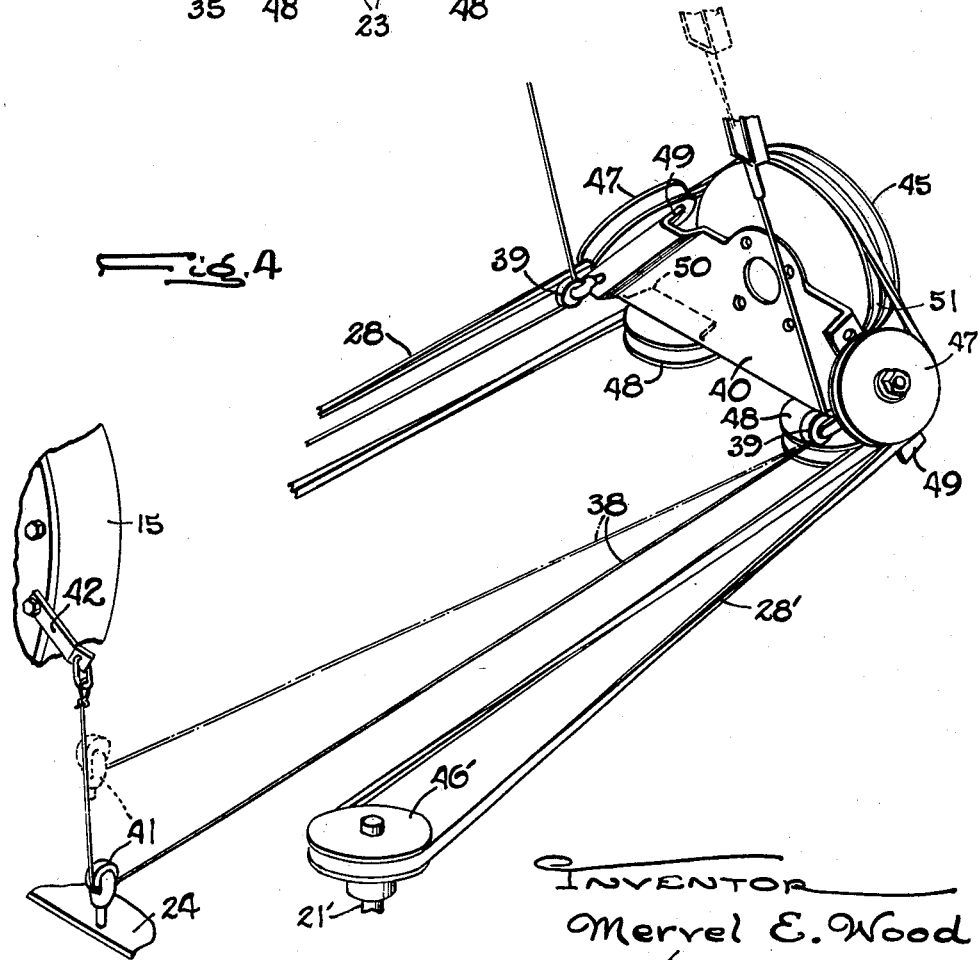
INVENTOR
Mervel E. Wood
by Wolfe, Hubbard, Voit & Osann
ATTORNEY

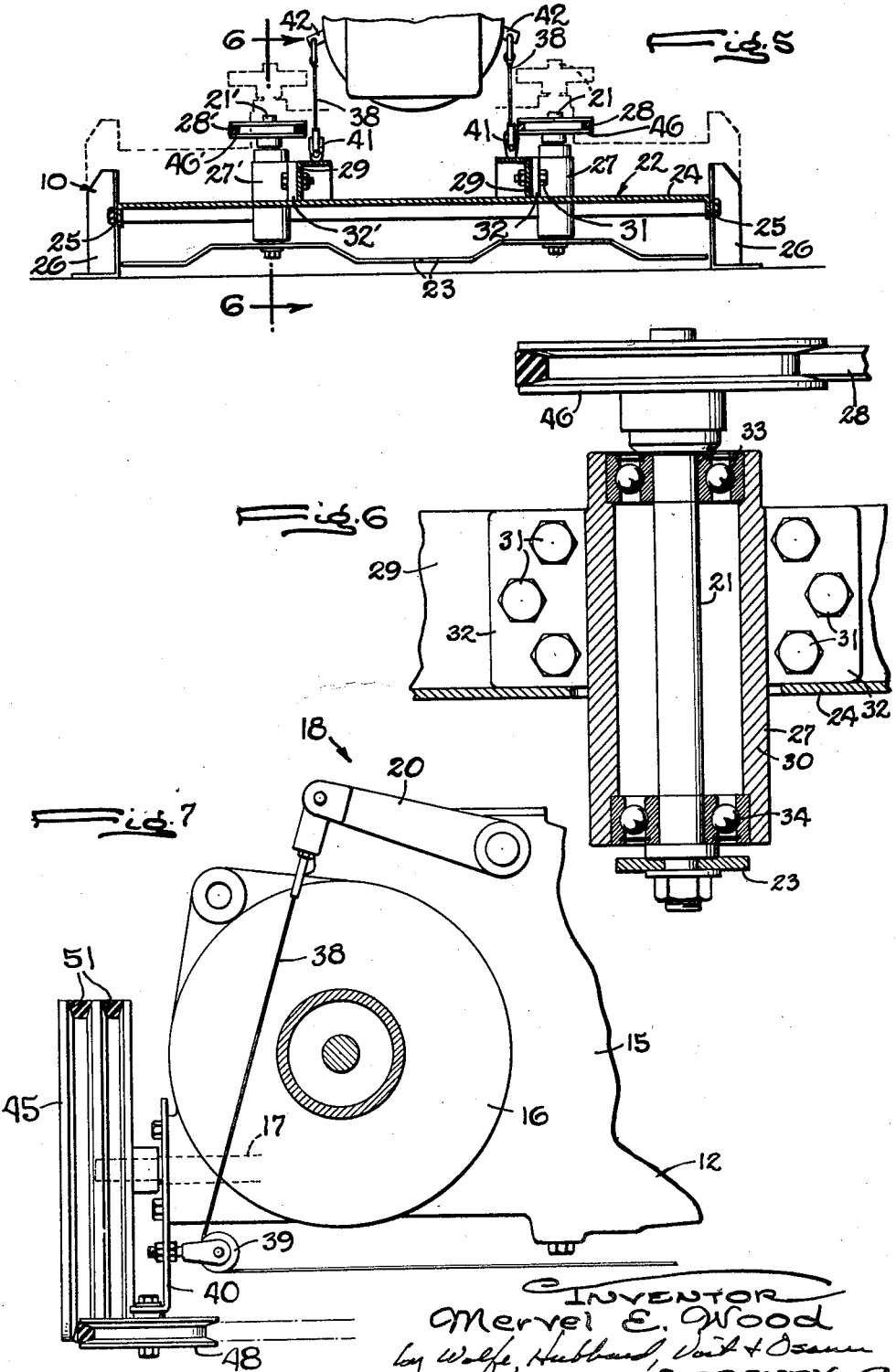

United States Patent Office 3,080,696
Patented Mar. 12, 1963

3,080,696
DEVICE FOR ATTACHING IMPLEMENTS TO TRACTORS
Mervel E. Wood, Oregon, Ill., assignor to Wood Brothers Manufacturing Company, Oregon, Ill., a corporation of Illinois
Filed June 21, 1960, Ser. No. 37,621
1 Claim. (Cl. 56—25.4)

The present invention relates generally to implements which are adapted to be mounted beneath a tractor between the front and rear wheels thereof and which are driven from the power take off of the tractor. More particularly, the invention relates to a rotary type mower having horizontal cutting blades mounted on a vertical spindle which is journaled in a housing enclosing the blades and which is driven by a belt extending around a sheave fixed to the power take off shaft. The mower is movable between a lowered operating position and a raised, out-of-the-way position.

The primary object of the invention is to provide a mower of the above type which is constructed in a novel manner enabling it to be mounted beneath a low-slung tractor having the body supported close to the ground.

Another object is to construct the mower so that the spindle is to one side of the body thus providing clearance to raise the mower to the out-of-the-way position.

Still another object is to journal the spindle on the housing in a novel manner whereby the major portion of the spindle is disposed above the housing.

Still another object is to provide a mower having two spindles journaled on opposite sides of the tractor to provide a mower having a cut extending substantially across the full width of the tractor and, at the same time, having sufficient clearance to enable it to be raised to the out-of-the-way position.

Other objects and advantages of the invention will become apparent from the following detailed description taken in connection with the accompanying drawings in which—

FIGURE 1 is a fragmentary sectional view taken along line 1—1 of FIG. 2 and showing a mower embodying the novel features of the present invention.

FIG. 2 is a plan view of the mower showing the tractor in phantom.

FIG. 3 is a rear view of the mower, the tractor being shown in phantom.

FIG. 4 is a fragmentary perspective view of the belt drive for the cutter spindles.

FIG. 5 is an enlarged sectional view taken along 5—5 in FIG. 1.

FIG. 6 is an enlarged sectional view taken along 6—6 in FIG. 5.

FIG. 7 is a fragmentary view of the differential housing showing the mechanism for raising the mower.

The present invention is shown in the drawings for purposes of illustration embodied in a rotary type mower 10 adapted to be attached to a tractor 11. The latter is of the conventional agricultural type having a body 12 supported on steerable front wheels 13 and relatively large rear traction wheels 14. The usual type of transmission and differential convey power from an engine (not shown) in the front of the tractor 11 to the rear wheels 14. The transmission and differential are enclosed in housings 15 and 16 which form a part of the body 12 of the tractor 11. Power from the engine is utilized to drive various implements cooperatively attached to the tractor through the medium of a power take off shaft 17 driven from gearing (not shown) within the transmission and extending horizontally and rearwardly from the rear end of the tractor 11.

Tractors of this type are usually equipped with connecting means (not shown) at the rear end through which means the various implements are connected to the tractor (FIG. 3). Usually, the connecting means includes a lifting means 18 which, in the present instance, includes levers 20 fulcrumed at one end to the housing 16. Power means (not shown) swings the levers about the fulcrum whereby the implements may be raised or lowered.

Rotary mowers 10 of the type with which the present invention is concerned comprise, generally, a power-driven spindle 21 journaled in a frame or housing 22 to rotate about a vertical axis and having elongated cutter blades 23 fixed to the lower end of the spindle 21 to rotate in a horizontal plane. The housing 22 includes a flat mounting plate 24 disposed in a plane substantially parallel to the ground and having flanges 25 at opposite sides which flanges extend downwardly toward the ground. Skids 26 are attached to the flanges 25 to engage the ground and support the mower 10. Usually the spindle 21 is operatively coupled to the power take off shaft 17 and thus is rotated by power derived from the tractor engine.

Many tractors are built in such a manner that the body 12 is relatively close to the ground. With such tractors there is not enough room between the transmission and differential housings 15 and 16 and the ground to permit prior rotary mowers to be mounted in an underslung position beneath the tractor 11. In accordance with the present invention, the mower is constructed in a novel manner enabling it to be mounted beneath a low slung tractor whereby the various advantages such as better maneuverability may be enjoyed. At the same time, the mower may be moved between a lowered, operating position and a raised, out-of-the-way position. To this end, the spindle 21 is disposed to one side of the tractor body 12 and, in the raised position, lies alongside of the transmission housing 15. In addition, the spindle 21 is journaled in a support 27 fixed to the plate 24 so that the major portion of the spindle is above the plate. This enables a shallow housing 22 to be utilized, that is, a housing in which there is relatively little clearance between the plate 24 and the ground. A novel belt arrangement transmits the power from the shaft 17 to the spindle 13.

In order that the mower 10 cuts substantially across the full width of the tractor 11, two vertical spindles 21 and 21' are used and are located beneath the tractor 11 and on opposite sides of the transmission housing 15, a set of blades 23 being attached to each spindle. Two separate endless V-belts 28 and 28' individually couple the spindles 21 and 21' to the power take off shaft 17. One of the spindles 21 is journaled on the plate 24 to turn about an axis located ahead of the other spindle 21' whereby the circular paths described by the outer edges of the rotating blades 23 overlap in the direction of movement of the mower and the cut area extends across the width of the mower.

To permit the housing 22 of the mower 10 to be shallow, as set forth above, advantage is taken of the spaces on opposite sides of the transmission housing 15 by projecting the major portion of each spindle 21 and 21' above the mounting plate 24. For this purpose, the bearing support 27 is attached to a brace 29 upstanding from the top of the plate 24 and rigid therewith. Herein, the support 27 comprises a sleeve 30 disposed concentric with the spindle 21 and attached to the braces 29 by bolts 31 passing through ears 32 projecting laterally from opposite sides of the sleeves and threaded into the braces. The spindle 21 is journaled in two frictionless type bearings 33 and 34 spaced apart along the spindle and mounted in opposite ends of the sleeve.

The mower 10 is attached to the tractor 11 through the medium of rearwardly extending rails 35 each having one end rigid with the mower housing 22 at the trailing edge thereof and the opposite end pivoted at 35a on an arm 36 secured to the rear axle housing 37 and depending downwardly and rearwardly therefrom. The leading edge 10a of the mower 10 is attached, through a system of cables and pulleys, to the raising levers 20 at the rear of the tractor 11. Thus, upon actuation of the levers 20, the mower 10 is rocked up and down about the pivot on the arms 36 between the raised and lowered position.

One cable 38 extends along each side of the tractor 11 between one of the levers 20 and the leading edge of the mower 10. Each cable 38 is attached at one end to the lever 20 and extends around a pulley 39 mounted on a bracket 40 fixed to the differential housing 16. The cable 38 extends forwardly and is threaded around a second pulley 41 fixed to the plate 24 adjacent the leading end of the mower 10. The end of the cable 38 extends upwardly from the second pulley 41 and is attached to a lug 42 rigid with the transmission housing 15. When the levers 20 are raised, the portion of cable between the pulley 39 and the lug 42 is shortened and thus the second pulley 41 and the leading edge of the mower are raised upwardly toward the lug. In the lowered position of the levers 20, the mower 10 is supported on the skids 26.

The cutting height of the mower 10 may be adjusted by mounting the skids 26 on the plate 24 so as to support the blades 23 at different heights above the ground. For this purpose, the skids 26 bolted on the flanges 25 formed on the plate 24 are promoted with a series of holes 43 whereby the skids may be attached at different heights. A series of holes 44 are also drilled in the arm 36 whereby the rails 35 may be pivoted at different heights on the arm and the mower carried in a generally horizontal plane regardless of the placement of the skids 26.

Each of the spindles 21 and 21' is driven from a driving sheave 45 splined to the power take off shaft 17 to rotate about the axis of the shaft in a vertical plane. The belts 28 and 28' couple the driving sheave 45 to driven sheaves 46 and 46' fixed to the upper end of each spindle 21 and 21' to rotate in a horizontal plane. To guide the belts 28 and 28' from the substantially centrally located driving sheave 45 along each side of the tractor 11 and to the driving sheaves 46 and 46', each belt passes over idler pulleys 47 and 48 mounted on the rear of the tractor.

Herein, the idler pulleys 47 and 48 are journaled on the bracket 40 bolted to the rear of the differential housing 16. Side flanges 49 on the bracket 40 are inclined to lie in planes extending substantially tangentially to the periphery of the driving sheave 45 and the idler pulleys 47 are journaled on the flanges 49 to rotate in planes tangent to the sheave 45. The idler pulleys 48 are journaled on flanges 50 formed on the lower side of the bracket 40 to rotate in a generally horizontal plane in which the lower edge 45a of the driving sheave 45 is disposed.

Two V-grooves 51 are formed in the driving sheave 45 to receive the two belts 28 and 28', one to drive each of the spindles 21 and 21'. Each belt 28 and 28' passes around the driving sheave 45 and forwardly beneath the tractor 11 to a driven sheave 46 and 46'. One run of each belt 28 passes over the top of the sheave 45 and around the inclined pulley 47 which guides it toward the driven sheave 46. The other run of the belt 28 extends from the driven sheave 46 around the idler pulley 48 and to the bottom of the sheave 45. In this way, advantage again is taken of the spaces alongside the transmission housing 15.

It will be appreciated that the novel construction of the mower described above enables it to be mounted directly on a low slung type tractor. By locating the spindles 21 and 21' at opposite sides of the tractor body and by mounting the spindles in a novel manner whereby the mower housing is of a shallow construction, the mower may be moved to a raised, inoperative position for transporting from place to place. At the same time, the spindles may be driven by a simple V-belt arrangement coupling the spindles to the power take off shaft of the tractor.

I claim as my invention:

A rotary type tractor mower comprising a mobile frame of the low-slung type having forward and rear ends, a cutter frame pivotally spaced adjacent the rear end of said mobile frame, a rotary type cutter supported adjacent the forward end of said cutter frame and laterally with respect to said mobile frame, a cutter operating sheave disposed upwardly of said cutter frame and coaxially with said cutter, a longitudinally extending power take-off shaft having a driving sheave thereon and operatively mounted on said mobile frame adjacent the rear thereof, two idler pulleys on said mobile frame between said driving sheave and said cutter operating sheave, and a belt extending about said driving sheave, over said idler pulleys and about said cutter sheave, said idler pulleys being disposed laterally of said mobile frame to the same side as said cutter with one pulley generally in the plane of said cutter operating sheave and with the other pulley above said one pulley and inclined toward said driving sheave.

References Cited in the file of this patent

UNITED STATES PATENTS

| | | |
|---|---|---|
| 2,513,685 | Smith et al. | July 4, 1950 |
| 2,681,536 | Kuhary et al. | June 22, 1954 |
| 2,706,879 | Barrentine | Apr. 26, 1955 |
| 2,711,624 | Crump | June 28, 1955 |
| 2,862,343 | Wood | Dec. 2, 1958 |
| 2,928,223 | Danuser | Mar. 15, 1960 |

FOREIGN PATENTS

| | | |
|---|---|---|
| 159,060 | Australia | Sept. 27, 1954 |